(12) United States Patent
Giraldo et al.

(10) Patent No.: US 9,223,127 B2
(45) Date of Patent: Dec. 29, 2015

(54) ELECTROWETTING DISPLAY DEVICE

(71) Applicant: Liquavista B.V., Eindhoven (NL)

(72) Inventors: Andrea Giraldo, Riehen (CH); Nicolas Eugene Bergeron, Stein (NL); Jozef Elisabeth Aubert, Roermond (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/187,711

(22) Filed: Feb. 24, 2014

(65) Prior Publication Data

US 2014/0168749 A1 Jun. 19, 2014

Related U.S. Application Data

(63) Continuation of application No. PCT/EP2012/066341, filed on Aug. 22, 2012.

(30) Foreign Application Priority Data

Aug. 24, 2011 (GB) .................................... 1114663.6

(51) Int. Cl.
*G02B 26/00* (2006.01)

(52) U.S. Cl.
CPC .................... *G02B 26/005* (2013.01)

(58) Field of Classification Search
CPC .................................................... G02B 26/004
USPC .......... 359/290–292, 228, 245, 315, 665, 900
See application file for complete search history.

(56) References Cited

U.S. PATENT DOCUMENTS

| | | |
|---|---|---|
| 2009/0027317 A1 | 1/2009 | Cheng et al. |
| 2009/0051633 A1 | 2/2009 | Yan et al. |
| 2009/0169806 A1 | 7/2009 | Lo et al. |
| 2010/0028405 A1 | 2/2010 | Goerne et al. |
| 2010/0284056 A1 | 11/2010 | Giraldo |
| 2010/0296149 A1 | 11/2010 | Feenstra et al. |
| 2010/0302615 A1 | 12/2010 | Aubert et al. |
| 2011/0058245 A1 | 3/2011 | Wang et al. |

FOREIGN PATENT DOCUMENTS

| | | |
|---|---|---|
| CN | 101355836 A | 1/2009 |
| CN | 101373265 A | 2/2009 |

(Continued)

OTHER PUBLICATIONS

International Search Report for International Application No. PCT/EP2012-066341, mailed Oct. 23, 2012.

*Primary Examiner* — Tuyen Tra
(74) *Attorney, Agent, or Firm* — BainwoodHuang

(57) ABSTRACT

An electrowetting display device has a picture element having first and second support plates with a space in between, the space including first and second fluids immiscible with each other, the second fluid being electroconductive or polar. The first support plate includes a wall defining an extent of the picture element. An electric field is applied between an electrode and the second fluid, the electrode having an edge, a low portion and a high portion, the high portion being closer to the second support plate than the low portion, the high portion being arranged adjacent to the wall and having an area smaller than the area of the low portion. The high portion of the electrode has a cut-out causing an increased electric field in the space, and at least part of the edge of the electrode adjacent to the cut-out following the shape of the wall.

27 Claims, 3 Drawing Sheets

(56) References Cited

FOREIGN PATENT DOCUMENTS

| | | |
|---|---|---|
| TW | 200933193 A | 8/2009 |
| WO | 03071346 A1 | 8/2003 |
| WO | 2007141218 A1 | 12/2007 |
| WO | 2009071676 A1 | 6/2009 |
| WO | 2009071694 A2 | 6/2009 |
| WO | 2011051413 A1 | 5/2011 |
| WO | 2011080224 A1 | 7/2011 |

ELECTROWETTING DISPLAY DEVICE

BACKGROUND

A known electrowetting display device comprises a plurality of picture elements having a first support plate and a second support plate. A space between the support plates is filled with a first fluid and a second fluid immiscible with each other; the second fluid is electroconductive.

The extent of each picture element is determined by a wall encircling the picture element. The wall confines the first fluid to the picture element. An electrode has a low portion and a high portion within the picture element, the high portion being closer to the second support plate than the low portion. The high portion is arranged between two corners of the wall. The increased electric field above the high portion of the electrode will force the first fluid away from the wall when a voltage is applied to the electrode, thereby reducing pinning of the first fluid on the wall.

It is desirable to improve the control of the motion of the first fluid.

DETAILED DESCRIPTION

Figure 1:
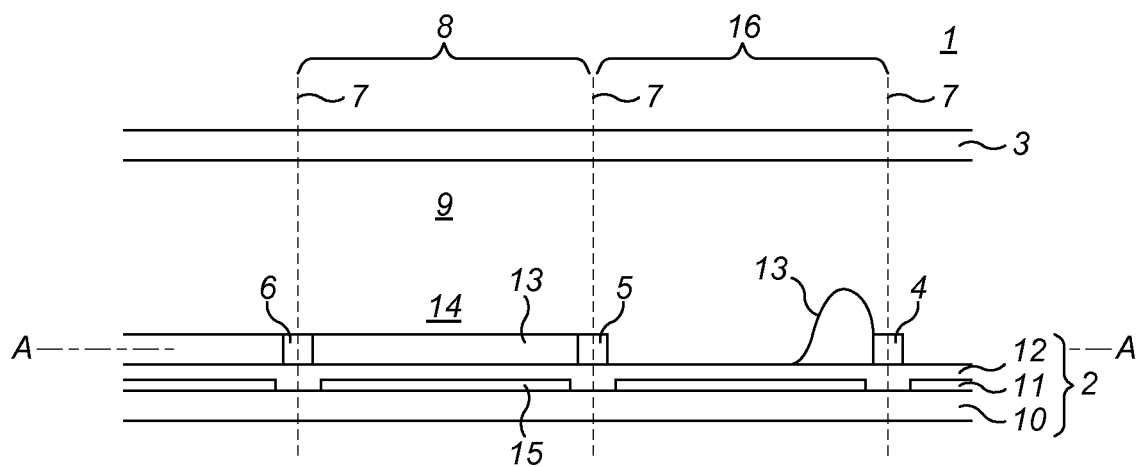
FIG. 1 shows a cross-section of known picture elements.

Embodiments described herein relate to an electrowetting display device.

Before describing detailed embodiments referencing the Figures, embodiments will be described in summary form.

In accordance with embodiments, there is provided an electrowetting display device comprising at least one picture element having a first support plate and a second support plate and a space between the first support plate and the second support plate, the space including at least one first fluid and a second fluid immiscible with each other, the second fluid being electroconductive or polar; the first support plate including a wall defining the extent of the picture element, the wall having a shape, an electrode for applying an electric field between the electrode and the second fluid, the electrode having an edge, a low portion and a high portion, the high portion being closer to the second support plate than the low portion, the high portion being arranged adjacent to the wall and having an area smaller than the area of the low portion;

the high portion of the electrode having a cut-out causing an increased electric field in the space, and at least part of the edge of the electrode adjacent to the cut-out following the shape of the wall.

The first fluid forms a layer on the first support plate when no voltage is applied between the electrode and the second fluid. The first fluid layer above the high portion of the electrode is thinner than above the low portion of the electrode. The cut-out in the electrode causes an electric fringe field when a voltage between the electrode and the second fluid is applied. The fringe field is relatively strong and has a relatively short range in the vicinity of the cut-out. Since the cut-out is arranged in the high portion, the fringe field will have a relatively strong effect on the thin first fluid layer above the high portion. Hence, when raising the voltage, the increased electric field near the cut-out will cause the first fluid to start moving preferentially near the cut-out.

A control of the place of initiation of the motion of the first fluid improves the control of the motion of the first fluid. The high portion of a known electrode did improve the motion of the first fluid away from the wall, but did not provide a well-defined place of initiation along the wall. As a result, the place of initiation in a known picture element changed over time and varied between picture elements. The initiation of the first fluid motion near the cut-out in a picture element according to embodiments avoids changes of the place of initiation over time and between picture elements. The cut-out causes a better control of the oil motion, improving the performance of the display device.

The linear extent of the high portion in a direction perpendicular to the wall and in the plane of the first support plate may be less than 20% of the size of the display area and may be less than 10%.

A cut-out is a shape of the electrode edge where the edge does not follow the shape of the wall adjacent to the electrode and at least part of the edge of the electrode adjacent to the cut-out does follow the shape of the wall, when viewed in a direction perpendicular to the plane of the first support plate.

Further features of embodiments will become apparent from the following description of embodiments, given by way of example only, which is made with reference to the accompanying drawings.

FIG. 1 shows a cross-section of a series of picture elements of a known display device 1. The device comprises a first support plate 2 and a second support plate 3. The first support plate 2 includes hydrophilic walls 4, 5, 6, which can be made of for example photoresist material such as SU8. The extent of a picture element is the area in the plane of the first support plate enclosed by the center of the wall; the center of the walls is indicated by dashed lines 7. Picture element 8 has a space 9 defined by the first support plate 2, the second support plate 3 and the center of the walls 5 and 6. The first support plate 2 includes a substrate 10, e.g. a plate of glass or plastic, on which electrodes 11 are arranged. Each picture element has an electrode which is connected to a control line for providing a voltage. The electrodes are covered by a hydrophobic layer 12, for example made of the amorphous fluoropolymer AF1600. The first support plate may include other elements, such as transistors and insulating layers, not shown in the Figure.

The space 9 comprises a first fluid 13, which may be a liquid, confined to the space by the walls 5 and 6, and a second, electroconductive or polar fluid 14, which may be a liquid. The first fluid may be for example oil, the second fluid for example water. The fluids are immiscible. When no voltage is applied between the electrode 15 and the second fluid 14, there is no electric field between the second fluid and the electrode; the first fluid 13 is spread out in the picture element and forms a layer between the second fluid 14 and the first support plate 2, adjoining the hydrophobic layer 12, as shown for the picture element 8. When a voltage is applied, the resulting electric field causes the first fluid to contract near one of the walls, as shown for picture element 16. The phrase 'near a wall' means adjoining a wall or being close to a wall; it excludes a contraction on the hydrophobic layer 12 in middle of the picture element. The movement of the first fluid under the influence of an applied electric field, the so-called electrowetting effect, is more fully described in international patent application WO2003/071346. When the oil and/or the water has specific optical properties for absorption, reflection and/or transmission of light, the picture element can operate as a light valve in a display device. The display device may be of the reflective, transmissive or transflective type.

Figure 2:
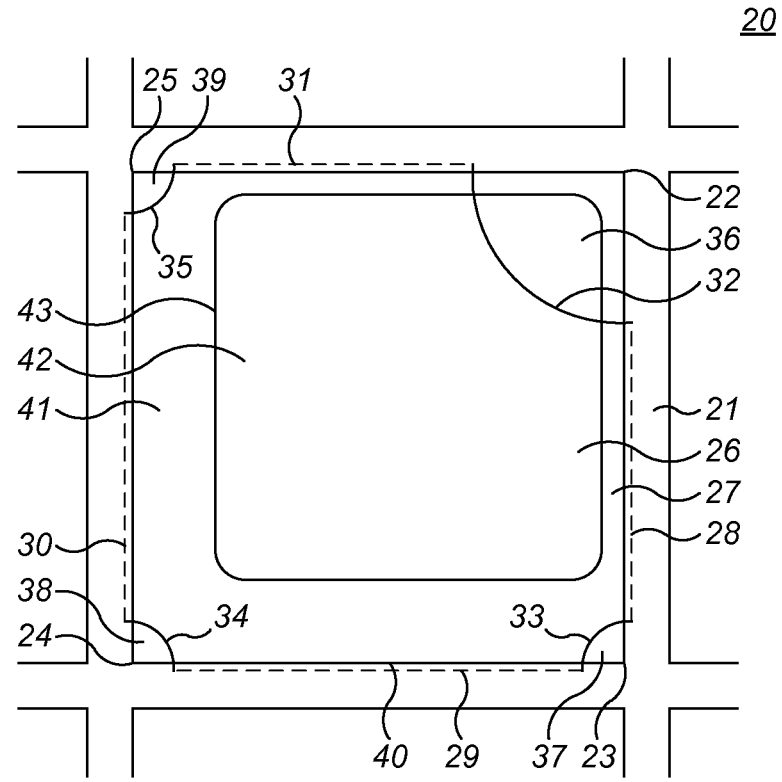
FIG. 2 shows a top view of a picture element according to embodiments.

FIG. 2 shows a top-view of a first support plate 20 according to embodiments along line A-A in FIG. 1 and as seen from the space 9. The Figure shows one picture element 8 and part of eight neighboring picture elements. The Figure shows a wall 21 of the picture element and several electrically conducting elements. The wall has four corners 22-25. A corner has an angle that differs more than 20 degrees from 180 degrees. The four corners of the embodiment shown have an angle of 90 degrees. The extent of the picture element in the plane of the first support plate 2 is the area within the center of the wall 21. The area between the inner side of the wall, to which the first fluid is confined, is called the display area 26. The display effect of the picture element occurs in this area. The edges of elements visible from the space 9 are shown by a drawn line, the edges of elements covered by another element are shown by a dashed line; the hydrophobic layer is not shown in the Figure. A typical size of the display area is 145 micrometer by 145 micrometer. A wall has a typical width of 10 micrometer. For sake of clarity the Figure provides details according to embodiments mainly for picture element 20 and not for the neighboring picture elements.

An electrode 27 covers a major part of the display area 26 in FIG. 2. In the embodiment shown the electrode has an edge indicated by dashed lines 28-31 and by edges 32-35. At the position of the dashed lines the electrode extends under the wall 21. The four edges 32-35 form cut-outs 36-39 of an otherwise square electrode. A cut-out is a part of the electrode where its edge does not follow the shape of the wall, i.e. the shape of the side 40 of the wall facing the display area 26. The parts 28-31 of the edge adjacent to each cut-out do follow the shape of the wall. A cut-out can also be defined as a concave part of the edge of the electrode.

The electrode 27 includes a high portion 41 and a low portion 42, on opposite sides of a line 43. In the embodiment shown, the high portion is arranged around the low portion. The high portion of the electrode is arranged on a protrusion of the first support plate 20 and is closer to the second support plate of the display device than the lower portion. The high portion is arranged adjacent to the wall 21 and extends from the line 43 to the inner side of the wall. The area of the high portion is smaller than the area of the low portion. The linear extent of the high area from the side 40 of the wall may be dependent on the electrically conducting elements arranged in the first support plate, as explained below. In the particular embodiment of FIG. 2, the linear extent is 5 micrometer near edges 28 and 31, 25 micrometer near the edge 29 and 15 micrometer near the edge 30.

Although the high portion 41 of the electrode in the embodiment shown in FIG. 2 extends along the entire inside of the wall 21, the high portion may also be arranged locally in one of the corners only, in some examples in the corner opposite the cut-out 36, or in other examples in two or three corners. A high portion extending along the wall between two neighboring corners increases the electric field along that part of the wall and incites the first fluid to move away from the wall. A cut-out of a high portion may be anywhere along the edge of the electrode 27. A high portion with a cut-out adjacent to a corner reduces optical losses, such as loss of contrast ratio or of aperture ratio. The high portion 41 in FIG. 2 has three cut-outs 37, 38 and 39. The cut-outs of the high portion are arranged in the corners 23, 24 and 25, respectively. The size of the cut-out 38 may be larger than the size of the cut-out 37 and 39.

Figure 3:
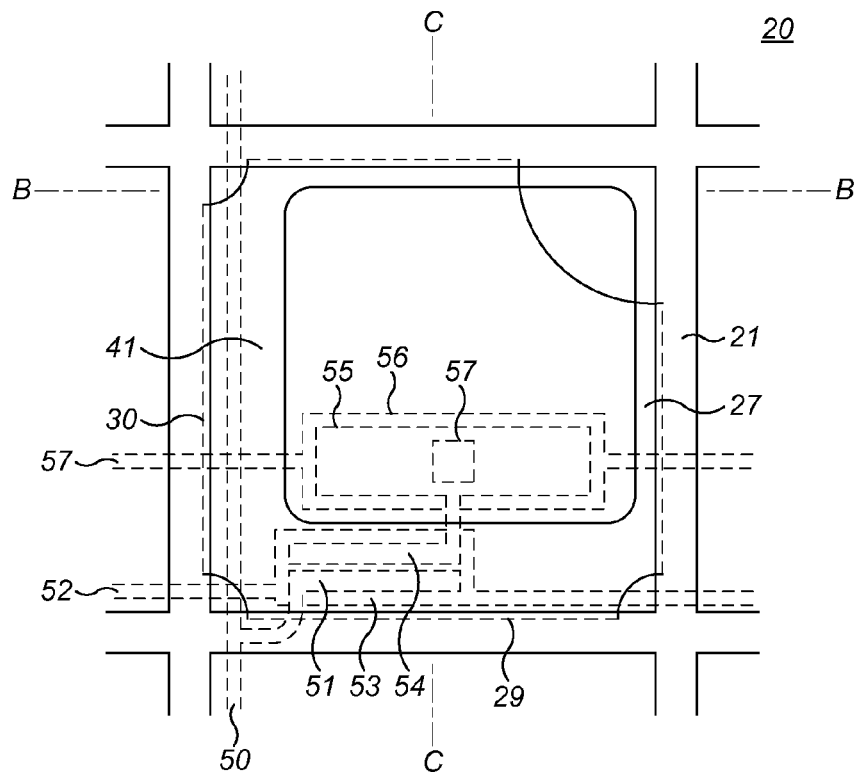
FIG. 3 shows a top view of the picture element with electrically conducting elements.

FIG. 3 shows a top-view of the same picture element 8 of the first support plate 20 as in FIG. 2, but provided with the position of electrically conducting elements. The elements form a circuit diagram similar to a common circuit diagram for a picture element of the active matrix type. The circuit connects a source control line 50 and a gate control line 52 via a thin-film transistor (TFT) to the electrode 27. The source control line 50 is connected to a source 51 and the gate control line 52 is connected to a gate 53 of the TFT. A drain 54 of the TFT is connected to a top plate 55 of a storage capacitor. A bottom plate 56 of the storage capacitor is connected to a storage control line 57. A through-connection 57, also called a 'via', connects the top plate 55 to the electrode 27. Alternatively, the single TFT may be replaced by two TFTs in series. The control lines and the capacitor plates are made of a conductive material, e.g. a metal such as aluminum or aluminum molybdenum or a transparent material such as indium tin oxide (ITO). The thickness of the conductive layers may be between 100 nm and 300 nm.

The source control line 50 is arranged in the protrusion of the first support plate 20 under the high portion 41 adjacent the edge 30. The one or two TFTs are arranged under a broader part of the high portion adjacent the edge 29. This arrangement of elements allows the protrusion to be used both for forming the height necessary for the high portion and for providing space for the elements of the circuit.

Figure 4:
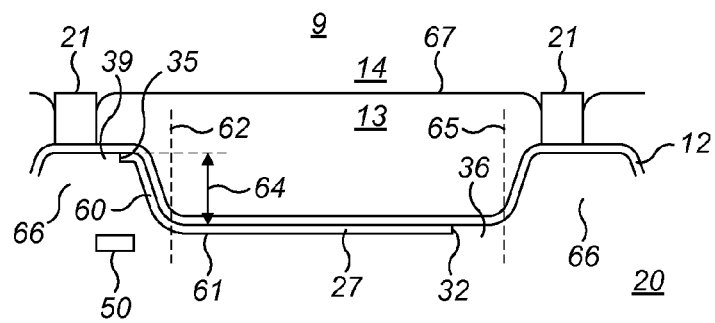
FIG. 4 shows a cross-section of the picture element.

FIG. 4 shows a cross-section of the first support plate 20 along the line B-B in FIG. 3. The hydrophobic layer 12 is shown as a single layer. The layer may be made of e.g. AF1600 having a thickness between 200 nm and 1000 nm. A protective layer of e.g. SiNx or SiOx having a thickness between 100 nm and 150 nm, not shown in the Figure, may be arranged in contact with and under the hydrophobic layer.

The electrode 27 extends from the cut-out edge 35 to the cut-out edge 32. The electrode has a high portion 60 and a low portion 61, separated by a dashed line 62. The dashed line indicates the position of the line 43 in FIG. 2. The dashed line marks the place where the height of the electrode begins to increase above the position of the low portion. The cut-out 36 is located in the low portion; the cut-out 39 is located in the high portion. A cut-out is regarded as located in a low/high portion if the major part of the edge of the cut-out is located in the low/high portion. The cut-out edge may be arranged on the highest part of the high portion, where it has the largest effect on the motion of the first fluid. In FIG. 4 the edge 35 is located in the high portion as it is on the high side of the dashed line 62; the edge 32 is in the low portion as it is on the low side of the dashed line 65, indicating the position of the line 43 on the other side of the picture element.

The high portion 60 is arranged on a protrusion 66 of the first support plate 20. The protrusion may be a layer of organic material. The high portion 60 and the low portion 61 have a maximum height difference indicated by the line 64, measuring on the side of the electrode facing the space 9. The maximum height difference is typically 2 micrometer, but may for example be between 1 and 4 micrometer. The wall 21 is arranged on the protrusion 66 and may have a height between 1 and 4 micrometer; an example value is 2 micrometer.

Figure 5:
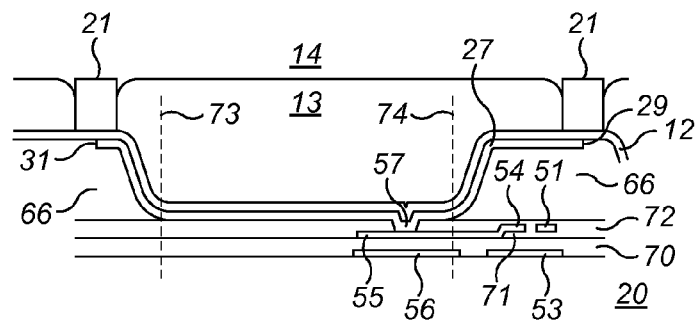
FIG. 5 shows a cross-section of the picture element.

FIG. 5 shows another cross-section of the first support plate 20 along the line C-C in FIG. 3. The gate control line 53 and the capacitor bottom plate 56 are covered by an insulating layer 70, e.g. made of silicon nitrite, SiNx, which may have a thickness between 150 nm and 300 nm. A layer 71 of amorphous silicon is arranged between the layer 70 and the source 51 and drain 54. The TFT and the storage capacitor are covered by an insulating layer 72 similar to the layer 70 and may have a thickness between 200 and 800 nm. When the display device is of a transmissive type, the electrode 27 and the conductive layers 53, 54, 56 may be made of a transparent conductive material such as ITO. When the display device is of a reflective type, the electrode may have the function of reflector and may be made of aluminum neodymium with a thickness between 100 nm and 150 nm. The electrode is connected to the capacitor top layer 55 by a through-connection 57 through the insulating layer 72. The through-connection is a local depression in the electrode. The division between the low portion and the high portion of the electrode is shown by dashed lines 73 and 74.

The edges 29 and 31 of the electrode 27 extend under the wall 21, as shown in FIG. 5. As a consequence, the electric field generated between the electrode and the second fluid 14 will remain relatively constant up to the wall 21, thereby providing a driving force for the first fluid 13 away from the wall and reducing the sticking of the first fluid to the wall. The electrode may be made of a metal if the wall is made of an opaque material; in that case ambient light falling onto the walls through the second support plate 3 will not reflect on the part of the electrode extending under the wall. If the wall is made of a transparent material, such as SU8, the part of the electrode under the wall may be made of a transparent material, such as ITO, to avoid reflection of ambient light on it that may reduce the contrast of the display device. Such an electrode can be arranged as set out in international application WO2009/071694, FIG. 4, elements 46 and 64.

The effect of the cut-outs in the electrode 27 on the motion of the first fluid 13 will now be explained with reference to FIG. 4. When a voltage is applied between the second fluid 14 and the electrode 27, an electric field is generated between them, having a strength inversely proportional to the distance between the electrode and the meniscus 67. Hence, the electric field generated above the high portion 60 of the electrode will be stronger than above the low portion 61 of the electrode. The edges 32 and 35 of the electrode 27 will cause a fringe field in the first fluid 13. The fringe field is relatively strong within a few micrometers from the edge. Hence, the fringe field of the edge 35 will exert a stronger force near the meniscus than the fringe field of the edge 32. The effect of the fringe field and the stronger field above the high portion will cause the first fluid to move away from the high portion at a lower applied voltage than without a cut-out in the higher portion. As a result, the threshold voltage for initiating the motion of the first fluid has become lower. The hysteresis in position of the first fluid versus the applied voltage has also become smaller.

Although the embodiment of FIG. 2 shows three cut-outs in high portions of the electrode, a single cut-out will also have an effect on the motion of the first fluid. For example, when an embodiment has only the cut-out 38 in a high portion, the first fluid will start moving in the corner 24 of the picture element. At a higher voltage, the first fluid will contract in the cut-out 36 in a low portion in the opposite corner 22. Since the cut-out is large, e.g. about 40 micrometer radius for this embodiment, the electric field near the corner will be low and the cut-out will act as a collection area where the first fluid prefers to collect at higher applied voltages. An electrode may be arranged in the cut-out 36, which is kept at the same voltage as the second fluid, to reduce the electric field in the area above the cut-out.

It has been found that a larger size cut-out is more effective in initiating motion of the first fluid. However, the size of the cut-out should not be too large, to avoid that the electric field over an area within the cut-out becomes so small that the first fluid does not move anymore on application of a voltage. A common range of size of a cut-out is from 4 to 35 micrometer for a 145 micrometer square picture element, which in some examples adjoins a layer of about 2 micrometer of first fluid; example values are 10, 20 and 30 micrometer. The radius is taken as the size of a circular cut-out as in the embodiment of FIG. 2.

When using two or more equal-size cut-outs in a high portion of the electrode, e.g. in neighboring corners, the second fluid will start moving at about the same time when increasing the applied voltage. This allows a motion of the first fluid substantially parallel to a straight side of the wall 21. One or more cut-outs in a high portion along a wall may achieve the same result. These latter cut-outs can be combined with the cut-outs in the corners to stimulate the parallel motion.

When using two or more cut-outs having different sizes in a high portion of the electrode, the control of the motion of the first fluid can be further improved. In the embodiment of FIG. 2 the larger cut-out 38 has a radius of 30 micrometer and the smaller cut-outs 37 and 39 have a radius of 15 micrometer. When increasing the applied voltage, the first fluid will start moving in the corner 24 of the larger cut-out where the fringe field is stronger and subsequently, at a higher voltage, in the corners 23 and 25. This improved control increases the likelihood that all first fluid of the picture element will collect in the corner 22.

Figure 6:
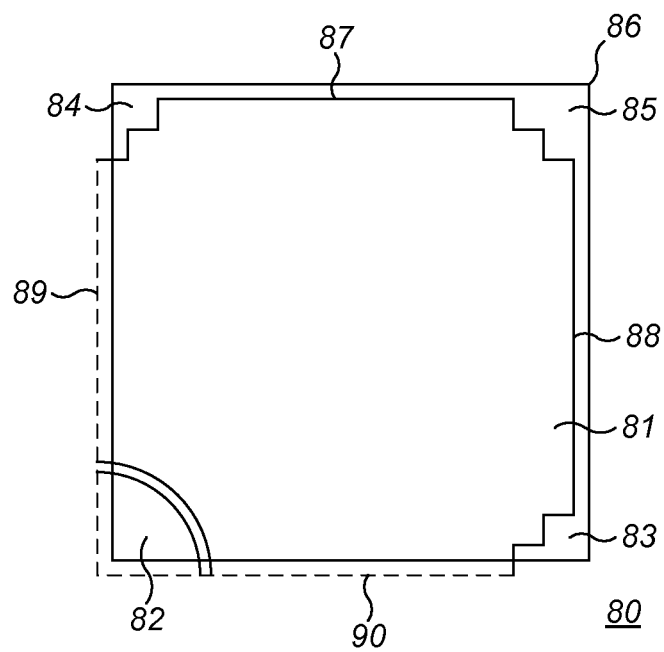
FIG. 6 shows a top view of an alternative embodiment of the picture element.

FIG. 6 shows a top-view of an alternative embodiment of a picture element 80, in which an electrode 81 has a cut-out 82 in a low portion and acting as collection area. An electrode may be arranged in the cut-out 82, which is kept at the same voltage as the second fluid, to reduce the electric field in the area above the cut-out. The electrode has three cut-outs 83, 84 and 85 in a high portion. The size of picture element is 150 by 150 micrometer and the size of the cut-out 85 is 30 micrometer, measured from the adjacent corner 86 along the diagonal of the picture element to an average straight line through the edge 87 of the cut-out. The size of the cut-outs 83 and 84 is 15 micrometer. The cut-outs 83-85 have an edge including at least three corners, including the corners at which the edge terminates. The presence of at least one corner in the edge increases the electric field across the first fluid. The cut-outs shown in FIG. 6 have five corners, each corner being 90 degrees. Alternatively, the angle of the corners may be different from 90 degrees. The number of corners may for example be 0 (cut-out with rounded edges), 1, 2 (as in the embodiment of FIG. 2), 3, 5 or 7.

Two adjacent edges 87 and 88 of the electrode 81 are arranged within the inner side of the wall, whereas two other adjacent edges 89 and 90 extend under the wall. The edges 87 and 88 will create a larger fringe field in the first fluid near the wall than the edges 89 and 90. Hence, the first fluid will tend to move away from the wall near edges 87 and 88 at a lower voltage than from the wall near edges 89 and 90, thereby enforcing motion of the first fluid towards the collection area 82. This feature can be used in any of the embodiments.

Figure 7:
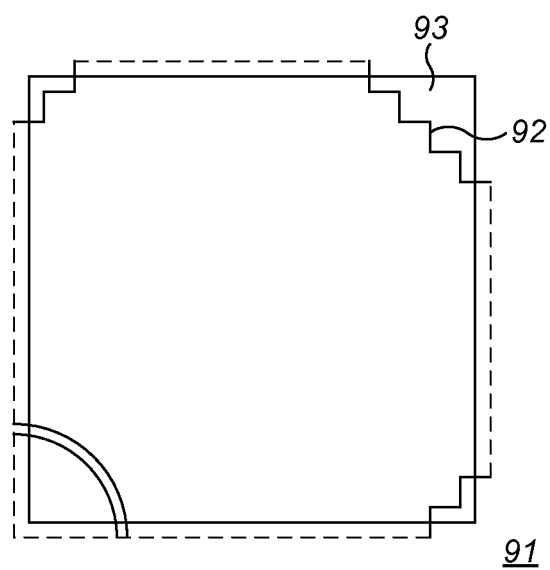
FIG. 7 shows a top view of a further embodiment of the picture element.

FIG. 7 shows a top-view of another embodiment of a picture element 91, similar to the embodiment of FIG. 6, but with nine corners in the edge 92 of the largest cut-out 93 in a high portion.

The above embodiments are to be understood as illustrative examples. Further embodiments are envisaged. For example, when the electrode 27 or 81 is reflective, a reflecting layer, which may be of the same material as the electrode, may be arranged in one or more cut-outs in high portions, but electrically not connected to the electrode. Such a reflecting layer enhances the reflectivity of the picture element. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. An electrowetting display device comprising a picture element having a first support plate and a second support plate and a space between the first support plate and the second support plate, the space including at least one first fluid and a second fluid immiscible with each other, the second fluid being electroconductive or polar; the first support plate including
a wall corresponding to an extent of the picture element, the wall having a shape,
an electrode for applying an electric field between the electrode and the second fluid, the electrode having an edge, a low portion and a high portion, the high portion being closer to the second support plate than the low portion, the high portion being arranged adjacent to the wall and having an area smaller than an area of the low portion;
wherein a part of the edge of the high portion of the electrode has a shape not following the shape of the wall, for causing an increased electric field in the space,
and at least part of the edge of the electrode adjacent to the part of the edge of the high portion of the electrode following the shape of the wall.

2. An electrowetting display device according to claim 1, wherein the wall has a corner and the part of the edge of the high portion of the electrode is arranged adjacent to the corner.

3. An electrowetting display device according to claim 1, wherein the wall has a first and a second corner, the high portion is a first high portion, and the electrode has a second high portion with a part of the edge of the second high portion having a shape not following the shape of the wall, the part of the first high portion and the part of the second high portion being adjacent to the first corner and the second corner, respectively.

4. An electrowetting display device according to claim 1, wherein the high portion of the electrode extends along the wall between two neighboring corners.

5. An electrowetting display device according to claim 4, wherein the part of the edge of the high portion of the electrode is a first part and a second part of the high portion of the electrode has a shape not following the shape of the wall, the first and second parts of the edge of the high portion of the electrode being adjacent respectively to said neighboring corners.

6. An electrowetting display device according to claim 4, wherein the high portion of the electrode is arranged on a protrusion of the first support plate and the wall is arranged on the protrusion.

7. An electrowetting display device according to claim 6, wherein at least one electrically conductive element is arranged in the protrusion.

8. An electrowetting display device according to claim 1, wherein the part of the edge of the high portion of the electrode is a first part and a second part of the high portion of the electrode has a shape not following the shape of the wall, a spacing between the first part of the edge of the high portion of the electrode and the wall is larger than a spacing between the second part of the edge of the high portion of the electrode and the wall.

9. An electrowetting display device according to claim 1, wherein the part of the edge of the high portion of the electrode has at least one corner.

10. An electrowetting display device according to claim 1, wherein the at least one first fluid forms a layer on the first support plate when no voltage is applied to the electrode, the layer extending over the high portion of the electrode.

11. An electrowetting display device according to claim 1, wherein the picture element has a collection space on the first support plate where the at least one first fluid collects on application of a voltage.

12. An electrowetting display device according to claim 1, wherein the part of the edge of the high portion of the electrode is configured to provide a location where the at least one first fluid starts moving preferentially when a voltage is applied to the electrode.

13. An electrowetting display device according to claim 1, wherein the shape of the part of the edge of the high portion of the electrode is concave.

14. An electrowetting display device according to claim 1, wherein a part of the edge of the low portion of the electrode has a shape not following the shape of the wall.

15. An electrowetting display device according to claim 14, wherein a further electrode is arranged between the part of the edge of the low portion of the electrode and the wall.

16. An electrowetting display device according to claim 1, wherein a first linear extent of the high portion of the electrode is greater than a second linear extent of the high portion of the electrode,
the first linear extent extending from a first location of an inner side of the wall in a direction perpendicular to the inner side of the wall, and
the second linear extent extending from a second location of the inner side of the wall in a direction perpendicular to the inner side of the wall.

17. An electrowetting display device according to claim 16, wherein the inner side of the wall has a substantially planar surface on which the first and second locations are located.

18. An electrowetting display device according to claim 16, wherein the inner side of the wall has a first substantially planar surface and a second substantially planar surface, the wall having a corner with the first substantially planar surface angularly displaced from the second substantially planar surface,
the first location located on the first substantially planar surface and the second location located on the second substantially planar surface.

19. An electrowetting display device according to claim 1, wherein the wall has at least one corner having an angle between two adjacent surfaces of the inner side of the wall, the angle differing by more than 20 degrees from 180 degrees.

20. An electrowetting display device according to claim 1, wherein a linear extent of the high portion of the electrode decreases in a direction parallel to an edge of the electrode, the linear extent extending from the edge of the electrode and in a direction perpendicular to the edge of the electrode.

21. An electrowetting display device according to claim 1, wherein a first linear extent of the high portion of the electrode in a direction perpendicular to an inner side of the wall is greater than a second linear extent of the high portion of the electrode in a direction perpendicular to an inner side of the wall.

22. An electrowetting display device according to claim 1, wherein the shape of the part of the edge of the high portion of the electrode positions the part of the edge of the high portion of the electrode away from the wall.

23. An electrowetting display device according to claim 1, wherein the part of the edge of the high portion of the electrode is substantially non-parallel to the wall and the at least part of the edge of the electrode adjacent to the part of the edge of the high portion of the electrode is substantially parallel to the wall.

24. A method of manufacturing a first support plate for an electrowetting display device having at least one picture element, the at least one picture element including the first support plate and a second support plate and a space between the first support plate and the second support plate, the space including at least one first fluid and a second fluid immiscible with each other, the second fluid being electroconductive or polar; the first support plate including
 a wall corresponding to an extent of the picture element, the wall having a shape,
 an electrode for applying an electric field between the electrode and the second fluid, the electrode having an edge, a low portion and a high portion, the high portion being closer to the second support plate than the low portion, the high portion being arranged adjacent to the wall and having an area smaller than an area of the low portion;
 a part of the edge of the high portion of the electrode having a shape not following the shape of the wall, for causing an increased electric field in the space, and at least part of the edge of the electrode adjacent to the part of the edge of the high portion of the electrode following the shape of the wall, the method comprising:
 a) providing a substrate having a surface; and
 b) providing a material on the surface with a form of the electrode.

25. A method according to claim 24, the wall having a corner, wherein the providing the material on the surface includes forming the material so the part of the edge of the high portion of the electrode is adjacent to the corner.

26. A method according to claim 24, the wall having a first and a second corner, the high portion is a first high portion, and the electrode has a second high portion with a part of the edge of the second high portion having a shape not following the shape of the wall, the providing the material on the surface including forming the material with the part of the first high portion and the part of the second high portion being adjacent to the first corner and the second corner, respectively.

27. A method according to claim 24, the providing the material on the surface including forming the material such that the high portion extends along the wall between two neighboring corners.

\* \* \* \* \*